US005388808A

United States Patent [19]
Laitre

[11] Patent Number: 5,388,808

[45] Date of Patent: Feb. 14, 1995

[54] HYDRAULIC JACK SYSTEM

[76] Inventor: Normand Laitre, 336 rue de L'Anse, Sullivan, Quebec, B. gr. 23, J0Y 2N0, Canada

[21] Appl. No.: 111,534

[22] Filed: Aug. 25, 1993

[30] Foreign Application Priority Data

Aug. 25, 1992 [CA] Canada ........................ 2076769

[51] Int. Cl.[6] ........................ B60S 9/22

[52] U.S. Cl. ........................ 254/35; 254/93 R; 254/134

[58] Field of Search .............. 254/93 H, 93 R, 133 A, 254/134, 33, 35

[56] References Cited

U.S. PATENT DOCUMENTS

| | | | |
|---|---|---|---|
| 2,164,621 | 7/1939 | Pfauser | 254/93 H |
| 2,200,133 | 5/1940 | Mandl | 254/93 H |
| 2,268,722 | 1/1942 | Picard . | |
| 2,420,910 | 5/1947 | Richards | 254/93 H |
| 2,494,099 | 1/1950 | Mandelko et al. . | |
| 2,527,428 | 10/1950 | Kemerer | 254/93 H |
| 3,099,435 | 7/1963 | Nixon | 254/35 |
| 3,615,157 | 10/1971 | Trotta . | |
| 3,891,187 | 6/1975 | Bearden, Jr. . | |
| 4,221,362 | 9/1980 | Van Santen | 254/133 A |
| 4,624,447 | 11/1986 | Richmeier . | |
| 4,660,806 | 4/1987 | Masters | 254/35 |

FOREIGN PATENT DOCUMENTS

| | | | |
|---|---|---|---|
| 209794 | 3/1921 | Canada . | |
| 268530 | 2/1927 | Canada . | |
| 490527 | 2/1958 | Canada . | |
| 654167 | 12/1962 | Canada . | |
| 213318 | 3/1968 | U.S.S.R. | 254/93 H |

*Primary Examiner*—Robert C. Watson
*Attorney, Agent, or Firm*—Jones, Tullar & Cooper

[57] ABSTRACT

A hydraulic jack system used for rerailing rail vehicles and for also lifting and lowering heavy loads comprises a base pivotable with respect to the horizontal, giving the hydraulic jack vertical and lateral lift motion. This is particularly advantageous when rerailing rail vehicles as both of these motions are necessary. The hydraulic jack of this invention also has the advantage of being small, portable and easy to assemble.

14 Claims, 3 Drawing Sheets

HYDRAULIC JACK SYSTEM

FIELD OF THE INVENTION

This invention relates to a hydraulic jack system and, in particular, to a hydraulic jack for rerailing rail vehicles and lifting heavy loads such as cars and machine tools.

BACKGROUND OF THE INVENTION

The prior art is replete with neumatic hydraulic jacks of various sorts capable of raising large and heavy equipment. The prior art devices typically only provide vertical lifting of the load. This is adequate for some purposes such as lifting cars for changing flat tires, however when rerailing rail vehicles, the rail vehicles must not only be lifted vertically but they must also be moved laterally or horizontally.

SUMMARY OF THE INVENTION

An object of the present invention is to provide a hydraulic jack system for lifting heavy loads. In particular, an object of the present invention is to provide a hydraulic jack system for retailing rail vehicles.

Generally, the present invention provides a hydraulic jack having a pivotable base for lifting loads at an angle. Thus, the hydraulic jack system can be positioned to lift the load at an angle with respect to the vertical, or it can be positioned to lift the load vertically and then pivot for lateral movement. Other advantages of the hydraulic jack system of this invention are that it is small, portable and easy to assemble.

In particular, the present invention provides a hydraulic jack system comprising: a housing; support means associated with the housing adapted to engage a load; a hollow cylinder connectable to the housing; a piston having an upper and a lower end, the piston being slidable within the cylinder; actuation means for communicating a supply of fluid to the hollow cylinder for moving the piston between a retracted position and an extended position, the actuation means being disposed generally within the housing; and a base pivotably mounted on the lower end of the piston.

Actuation of the actuator supplies fluid under pressure for communication to the cylinder. The fluid forces the piston to extend and consequently to lift the heavy load which rests on a support protruding from the housing.

BRIEF DESCRIPTION OF THE DRAWINGS

An embodiment of the invention will now be described by way of example with reference to the following drawings in which.

DETAILED DESCRIPTION OF THE PREFERRED EMBODIMENT

Figure 1:
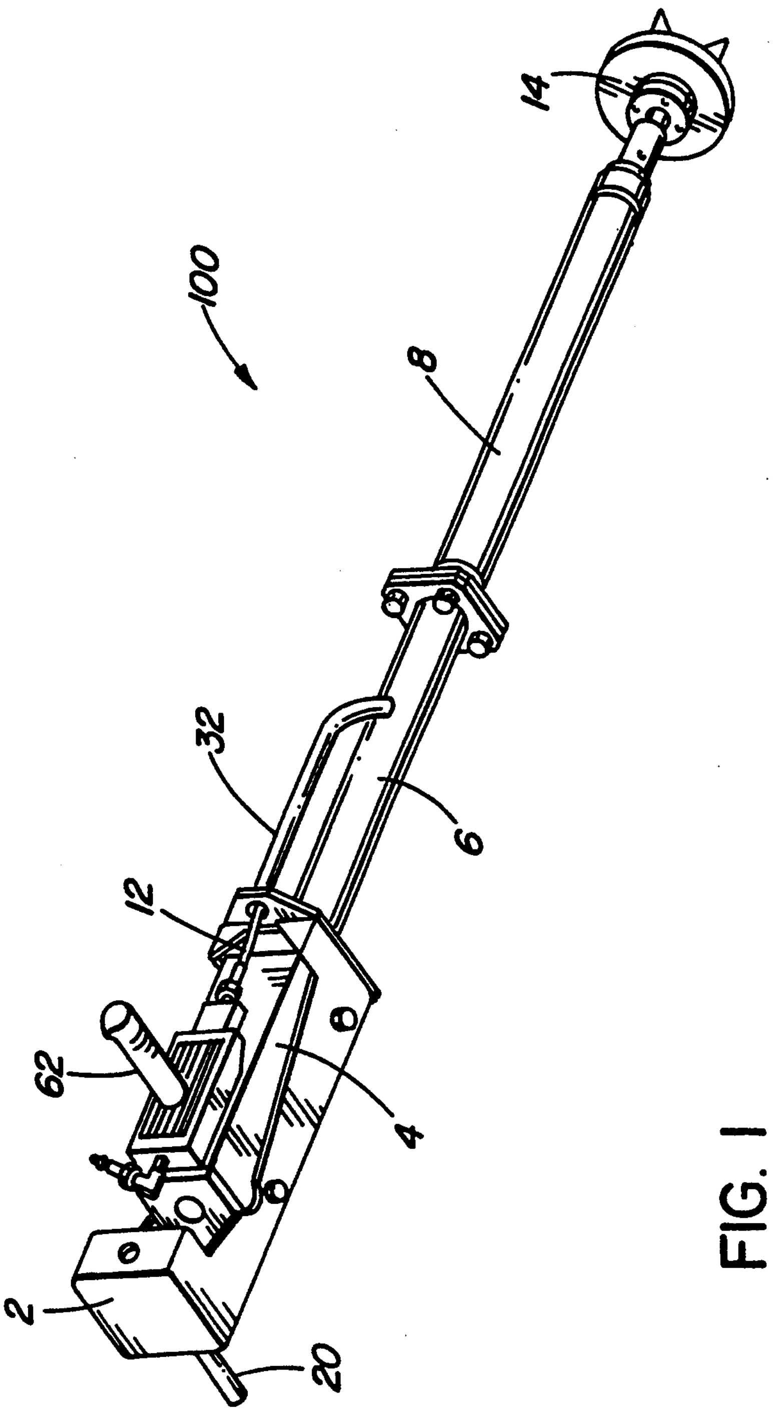
FIG. 1 is a perspective view of the hydraulic jack system in its retracted position.
Figure 2:
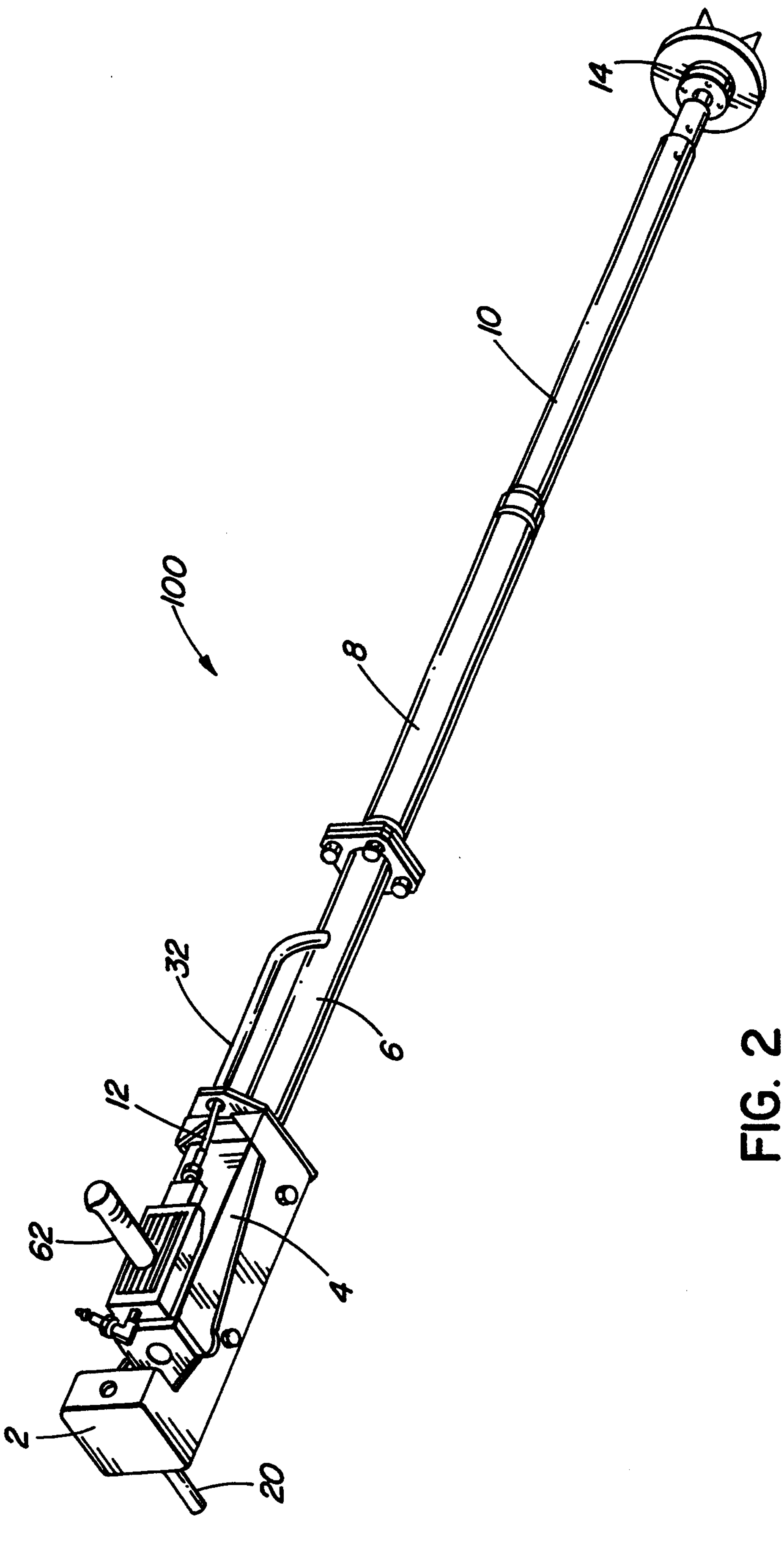
FIG. 2 is perspective view of the hydraulic jack system fully extended.

Referring to FIGS. 1 and 2, there is illustrated the preferred embodiment of the present invention in which the hydraulic jack is denoted by reference numeral 100. In general, the hydraulic jack 100 comprises a housing 2; a support member 20 extending from the housing 2; a hydraulic pump 4 housed within the housing 2; an extension member 6 depending from the housing 2; a cylinder 8 attached at its upper end to the extension 6; a ram or piston 10 slidable within the cylinder 8; a hydraulic line 12 for communicating hydraulic fluid from the pump 4 to the cylinder 8; and base 14 which is pivotably mounted on the distal end of the piston 10.

Figure 3:
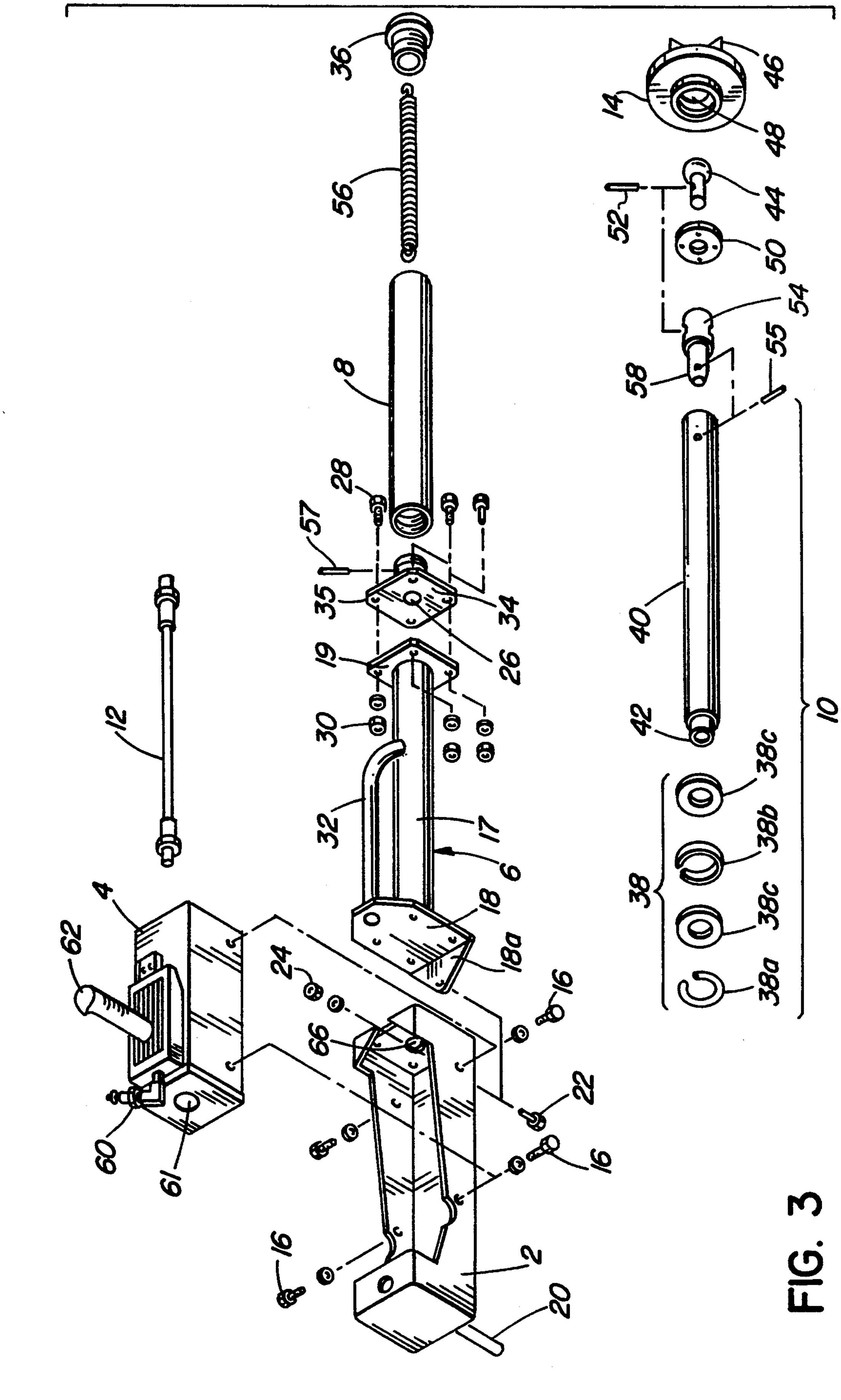
FIG. 3 is an exploded view of the hydraulic jack system.

Referring to FIG. 3, the structure of the present invention can be seen in greater detail. Housing 2 serves to contain and protect an actuator or hydraulic pump 4 which is bolted therein by bolts 16. The pump 4 has a sufficient reservoir therein for hydraulic fluid which is filled through inlet 61. The hydraulic pump is preferably of conventional design which may, for instance, be driven by compressed air supplied via a hose (not shown) to connector 60. The pump has a control handle 62 used to operate an internal valve mechanism which controls the supply of hydraulic fluid between the reservoir and the cylinder 8 by means of hydraulic line 12. The housing 2 also serves as a structural intermediary between the support member 20 and the cylinder 8.

Extension 6 comprises a hollow cylindrical central section 17 having flanges 18 and 19 disposed at the upper and lower ends thereof, respectively. The upper flange 18 is used to bolt extension 6 onto the housing 2. Preferably, the upper flange is provided with an upwardly extending tab 18*a* which is further bolted to the housing 2 by bolt 22 and nut 24 to provide additional strength at this connection.

Cylinder 8 includes a base member 34 threadingly connected thereto at its upper end and an annular head member 36 threadingly connected at its lower end. Base member 34 has a flange 35 which can be matingly bolted to lower flange 19 of the extension 6 by bolts 28 and nuts 30 or, as will be explained in greater detail hereinbelow, to the bottom of housing 2. Base member 34 includes a fluid inlet 26 to which the hydraulic line 12 is connectable for communicating hydraulic fluid under pressure from the pump 4 to the cylinder 8. Extension 6 preferably includes a conduit 32 which communicates with the interior of the central section 17, through which the flexible hydraulic line 12 is inserted. The conduit 32 provides protection for the hydraulic line 12 as well as serving as a handle with which the hydraulic jack 100 may be carried.

Cylinder 8 is hollow and adapted to receive the ram or piston 10 slidably therein. Piston 10 comprises a hollow cylindrical member 40 having a ring assembly 38 disposed on the upper end thereof and a piston head member 54 retained in its lower end by a retaining pin 55. Ring assembly 38 includes a retaining ring 38*a*, a resilient seal ring 38*b* and a pair of bearing rings 38*c*. Bearing rings 38*c* serve to compress axially seal ring 38*b* when held in place on upper end 42 by retaining ring 38*a*. Resilient seal ring 38*b* expands circumferentially under axial compression thereby providing a tight seal against the inner walls of cylinder 8. Seal ring 38*b*, along with the annular head member 36 of the cylinder 8, serve to support the cylindrical member 40 within cylinder 8.

Within cylinder 8 and slidable member 40 there is disposed a tension spring 56. The spring 56 is hooked at its upper end onto a pin 57 located within base member 34 and at its lower end onto hook 58 provided on piston head member 54, biasing piston 10 into a retracted position within cylinder 8 when fluid is not injected into cylinder 8. The extent to which piston 10 will extend will be limited by various stop means, namely: annular member 36 which has a reduced inner diameter as compared with that of cylinder 8, thereby preventing ring assembly 38 from sliding out of cylinder 8; the extent to which the tension spring 56 may stretch; and/or the amount of fluid injected as controlled by the controller 62. In another embodiment of this invention, tension spring 56 may be replaced by a reverse (two-way) actuator.

At the lower end of piston 10, base 14 is pivotably mounted on piston head member 54. Base 14 has a socket 48 on its upper side adapted to receive ball 44 which is secured therein by retaining collar 50. The ball 44 is connectable to the piston head member 54 by means of pin 52. Base 14 is pivotable universally on ball 44, allowing hydraulic jack 100 to be positioned at a desired angle with respect to the load to be lifted. On the lower side of base 14 there is provided ground engaging members 46 to prevent base 14 from moving when hydraulic jack 100 is in operation.

In operation, hydraulic jack 100 is positioned under the load to be lifted. Depending on how the load is to be lifted, i.e. vertically or at an oblique angle with respect to the vertical, the base is positioned appropriately so that extension of the cylinder will cause the support 20 to engage the load at the desired location. Control means 62 is manipulated so as to communicate pressurized fluid from the hydraulic reservoir through hydraulic line 12 to the cylinder 8. The pressurized fluid forces piston 10 to slide downwardly and consequently to lift the heavy load resting on support 20. As mentioned above, the hydraulic jack system of the present invention has a universally pivotable base which allows the load to be lifted at an angle, that is, vertically and laterally simultaneously. The load may also be lifted vertically and then pivot for lateral movement. Alternatively, heavy loads may be lowered by diminishing the pressure of the injected fluid with control means 62. The migration of fluid from the cylinder will permit the lowering of the load under the influence of gravity. When no load is present and when the piston is still in an extended position, tension spring 56 will bias piston 10 into a retracted position, forcing the remaining fluid out of cylinder 8 as slidable member 40 slides back into cylinder 8.

It will be appreciated that the extension member 6 is modular in nature and that, depending upon the specific application, extension members of various lengths may be employed, provided that an appropriate length of hydraulic line is supplied. It is also contemplated that by connecting the flange 35 of the cylinder's base member 34 directly to the bottom of the housing 2, the extension member may be eliminated. In this case, the hydraulic line may be connected to the fluid inlet 26 of the cylinder's base member 34 by snaking through the space 64 between the pump 4 and the housing 2 (see FIG. 1), and through an opening 66 provided on the bottom of the housing 2.

While the foregoing preferred embodiments of the invention have been described and shown, it will be understood that all alternatives and modifications such as those suggested and others, may be made thereto and fall within the scope of the invention.

I claim:

1. A hydraulic jack system for setting derailed rail vehicles back upon their rails by lifting and move one end of said vehicle, comprising:

a housing;

a hollow cylinder;

a piston having an upper and a lower end, said piston being slidable within said hollow cylinder;

a removable extension member rigidly connected between said housing and said cylinder, said cylinder being rigidly connectable to said housing when said extension member is removed:

actuation means for communicating a supply of fluid to said hollow cylinder for moving said piston between a retracted position and an extended position, said actuation means being disposed generally within said housing;

a ground-engageable base pivotably mounted on the lower end of said piston for generally universal movement relative thereto when said end of said vehicle is being lifted and moved;

support means associated with said housing, said housing operating in a structural capacity between said support means and said extension member or between said support means and said hollow cylinder when said extension member is removed, said support means being non-rigidly engageable with said end of said vehicle for permitting lateral movement of said end of said vehicle while lifting.

2. A hydraulic jack system as claimed in claim 1, wherein the base is pivotably mounted to the piston means by means of a ball joint.

3.A hydraulic jack system as claimed in claim 1, wherein the base is provided with ground engaging members thereon to prevent the base from moving relative to the ground when the jack is in use.

4. A hydraulic jack system as claimed in claim 2, wherein the base is provided with ground engaging members thereon to prevent the base from moving relative to the ground when the jack is in use.

5. A hydraulic jack system as claimed in claim 1, wherein the actuation means comprises a compressed-air-driven, hydraulic pump and an associated hydraulic line.

6. A hydraulic jack system as claimed in claim 5, wherein the hydraulic pump has a self-contained reservoir for hydraulic fluid.

7. A hydraulic jack system as claimed in claim 5 further comprising control means for selectively communicating hydraulic fluid to the cylinder.

8. A hydraulic jack system for setting derailed rail vehicles back upon their rails by lifting and moving one end of said vehicle, comprising:

a housing having a support adapted to engage said end of said vehicle whereby a portion of said end of said vehicle rests upon said Support while being lifted and moved;

a hydraulic pump disposed in the housing together with a Compressed air-driven motor for operating the pump;

an extension member having flanges at its opposite ends, first end flange being attached to the housing;

a cylinder having a flange connected to a Second end flange of the extension member;

a piston slidable within the cylinder;

means for communicating pressurized fluid from the hydraulic pump to the cylinder for extending the piston and thereby enabling lifting of the end of said vehicle; and a ground engageable base pivotably mounted to the piston for universal movement relative thereto, whereby said base remains substantially flat on the ground during the lifting and moving of said vehicle end;

wherein the first and second end flanges of the extension member are attached respectively to the housing and the cylinder flange by bolts extending through bolt holes in the end flanges, cylinder flange and housing, and wherein the bolt holes of those of the housing and those of the cylinder flange allow the cylinder flange to be matingly bolted to the housing, whereby the extension member can be eliminated or replaced by a member of different length.

9. A hydraulic jack system as claimed in claim 8, wherein the extension member includes conduit means enclosing the hydraulic line.

10. A hydraulic jack system as claimed in claim 9 wherein the means for communicating fluid comprises a hydraulic line.

11. A hydraulic Jack system as claimed in claim 9, wherein the base includes ground engaging means for preventing relative movement between the base and the ground When the jack is in use.

12. A hydraulic Jack system as claimed in claim 9, wherein the base is mounted to the piston means by means of a ball joint.

13. A hydraulic Jack system as claimed in claim 9, wherein the hydraulic pump has a self-contained reservoir for hydraulic fluid.

14. A hydraulic Jack system as claimed in claim 9, further comprising control means for selectively communicating hydraulic fluid to the cylinder.

* * * * *